United States Patent Office 2,778,864
Patented Jan. 22, 1957

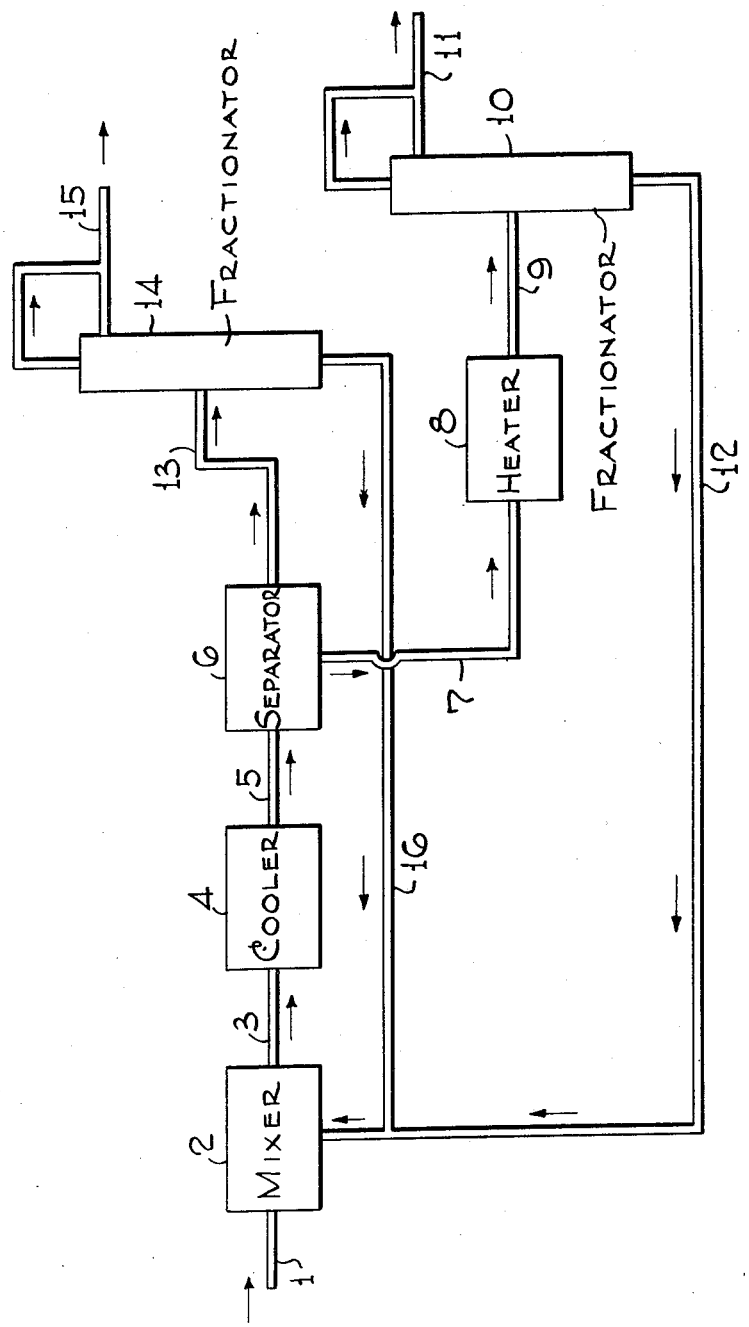

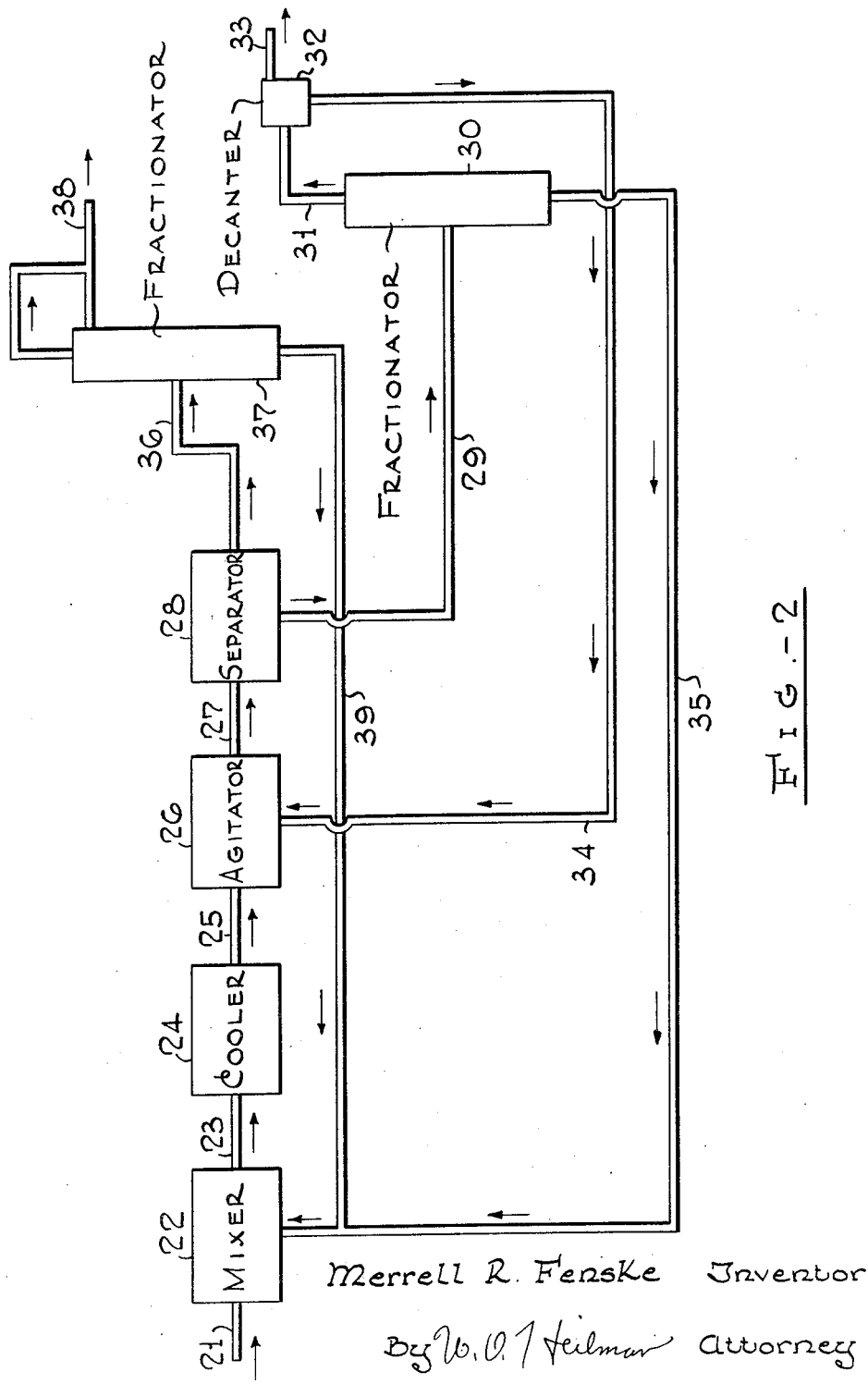

2,778,864

PROCESS FOR SEPARATING PURE PARA XYLENE BY COMPLEXING WITH ANTIMONY TRICHLORIDE

Merrell R. Fenske, State College, Pa., assignor to Esso Research and Engineering Company, a corporation of Delaware Application April 7, 1951, Serial No. 219,866

6 Claims. (Cl. 260—674)

The present invention relates to a method for separating aromatic hydrocarbons and is particularly concerned with the separation of para xylene from a mixture of meta and para xylenes.

The isometric xylenes are useful industrial chemicals. Ortho xylene is particularly suitable as a chemical for oxidation to phthalic anhydride. The ortho xylene isomer can be separated from any mixture of C–8 aromatics by efficient fractional crystallization. Para xylene is similarly useful as a raw material for the preparation of terephthalic acid. When para xylene is mixed with meta xylene the only known practical method for separating it is by fractional crystallization down to a temperature of −58.5° C. at which para xylene forms a solid eutectic with meta xylene containing about 13% by weight of para xylene and 87% by weight of meta xylene and no further amounts of pure para xylene can be separated. This method has the disadvantage, however, of requiring extensive refrigeration which increases the cost.

The present invention, therefore, is concerned with a process for separating pure para xylene at temperatures which do not require refrigeration.

To the accomplishment of the foregoing and related ends the invention then comprises the features hereinafter fully described, the description and drawings setting forth in detail certain illustrative embodiments of the invention, these being indicative, however, of but a few of the various ways in which the principle of the invention may be employed.

Figure 1 is a flow diagram of one embodiment of this invention.

Figure 2 is a flow diagram of a modification of Figure 1.

According to the present invention antimony trichloride complexes of the various aromatics in an aromatic hydrocarbon mixture are formed and the fixture of complexes are cooled to separate one aromatic from another by virtue of the difference in the freezing point of the aromatic complexes. The invention is particularly concerned with the separation of para xylene from meta xylene and/or other C–8 aromatic hydrocarbons.

When antimony trichloride is mixed in various proportions with a mixture of meta and para xylene it is found that the mixture forms a eutectic at a temperature depending upon the amount of antimony chloride present, the temperature increasing with increase in the amount of antimony trichloride in the mixture as shown in the following table:

| Mol. % $SbCl_3$: | Temperature of eutectic, °C. |
|---|---|
| 0 | −58.5 |
| 11 | −35 |
| 32 | −2 |
| 50 | +28 |
| 65 | +37 |

The eutectic formed with antimony chloride has the same composition as the eutectic formed at −58.5° C. with 0% $SbCl_3$, i. e. 87% by weight of meta xylene and 13% by weight of para xylene. Therefore, pure para xylene can be separated from meta xylene in the presence of antimony trichloride in the same manner but at much higher temperatures than when the hydrocarbons are used alone.

Referring now to Figure 1, a mixture of meta and para xylene, wherein the amount of para xylene is greater than 13%, is fed by line 1 into mixer 2 along with molten anhydrous antimony chloride in the ratio of 2 mols of antimony chloride per mol of meta-para xylene mixture that is, to produce a mixture containing about 66⅔ mole percent antimony trichloride. The mixer is maintained at a temperature of 70° C. The mixture of hydrocarbons and antimony trichloride is passed by line 3 to cooler 4 where the temperature is reduced to 39° C. At this temperature crystals of $(SbCl_3)_2$ (para xylene)$_1$ precipitate. The mixture of eutectic liquid and crystals of para xylene-antimony chloride complex are passed by line 5 to separator 6 where the crystals are separated from the eutectic liquid by filtration, centrifuging or other conventional means. The crystals pass by line 7 to heater 8 where the temperature is increased to 75° C. to melt the crystallized complex. The melted complex is passed by line 9 to fractionator 10 from which pure para xylene is taken off overhead through line 11 and liquid antimony trichloride is removed through line 12 and recycled to mixer 2. The eutectic liquid is removed from separator 6 by line 13 and introduced into fractionator 14 from which a mixture of 13% para xylene and 87% meta xylene is removed overhead through line 15 and antimony trichloride is removed through line 16 and recycled by line 12 to mixer 2.

Figure 2 shows a modification of the process disclosed in Figure 1 in which a third component is introduced to aid in separating the para xylene. Referring, therefore, to this drawing, a mixture of meta and para xylene containing more than 13% para xylene is passed by line 21 into mixer 22 together with antimony trichloride in the ratio of 1.5 mols of $SbCl_3$ per mol of hydrocarbons. From the mixer, the mixture is passed by line 23 to cooler 24 where the temperature is reduced to 30° C. At this temperature crystals of $(SbCl_3)_2$ (para xylene)$_1$ are precipitated in a bath of liquid consisting of a mixture of antimony trichloride and a hydrocarbon mixture of 13% para xylene and 87% meta xylene. This mixture of liquid and crystals is passed by line 25 to agitator 26 where it is mixed with a third component acting as a wash solvent, i. e. inert toward the ingredients of the mixture, and as an aid in separating the para xylene crystals. This third component must be immiscible with the hydrocarbon and with the antimony trichloride. In addition it must have a density intermediate that of the meta xylene:para xylene:antimony trichloride eutectic liquid and the $(SbCl_3)_2$ (p-xylene)$_1$ crystals. For that reason it is desirable to lower the mol ratio, antimony chloride to xylene, to allow a greater spread between the density of the crystals and the liquid. Thus by the time the eutectic is reached the liquid phase will contain the antimony chloride:xylene in a mol ratio of about 1:1. With this ratio there is a reasonable density spread between the crystals and liquid thus allowing some latitude in the density of the third component. Suitable third components are the perfluoro compounds of the proper density. These compounds are immiscible with both hydrocarbons and antimony trichloride. In the instant case perfluorodimethylcyclohexane can be used since it has the proper density. Accordingly this material is added by line 34. After the fluorocarbon has been thoroughly mixed with the hydrocarbons and the antimony trichloride, the mixture is passed by line 27 to settler 28 where two phases separate. The lower phase, consisting of the perfluoro compound and the p- xylene-SbCl₃ complex, is passed by line 29 to fractionator 30 from which a mixture of p-xylene and the perfluoro compound is removed overhead through line 31. This mixture is passed into decanter 32 where two phases separate. The upper phase consisting of pure p-xylene is withdrawn by line 33 while the lower phase consisting of the perfluoro compound is recycled to agitator 26 by line 34. Make-up fluorocarbon may be added to the decanter or at any point in line 34 as desired. Antimony trichloride is removed from the bottom of fractionator 30 and recycled to mixer 2 by line 35.

The mixture of eutectic liquid and antimony chloride is removed from separator 28 by line 36 and passed into fractionator 37 from which the eutectic liquid is removed through line 38 and the antimony chloride through line 39, through which it is recycled to mixer 2.

The above description indicates that the present invention affords a means for separating pure para xylene from a mixture of para and meta xylene at temperature above 0° C. using at least 1 mol of antimony chloride per mol of hydrocarbon mixture.

The process is applicable to the separation of other aromatic hydrocarbons. For example, it is suitable in separating para xylene from a mixture with other C₈ hydrocarbons in addition to meta xylene. In this case the para xylene-antimony chloride complex will crystallize out until the eutectic is reached. This eutectic will consist of 13% para xylene and 87% of the other hydrocarbons in the mixture, the exact composition depending upon their ratio in the original mixture.

The nature and objects of the present invention having been thus described and illustrated, what is claimed as new and useful and is desired to be secured by Letters Patent is:

1. A process for separating para xylene from a C₈ aromatic hydrocarbon fraction containing more than 13 weight percent of para xylene, which comprises mixing the hydrocarbon fraction at an elevated temperature with a complexing agent consisting essentially of antimony trichloride, in a ratio of at least 1 mole of antimony trichloride per mole of aromatic feed, cooling the resulting mixture until a eutectic liquid phase and a solid complex of para xylene with antimony trichloride is formed, mixing the cooled mixture of eutectic liquid and solid complex with a liquid fluorocarbon that is immiscible with the hydrocarbons present and has a density between that of the eutectic liquid and of the solid complex, separating the solid complex from the eutectic liquid, and recovering para xylene from the separated solid complex.

2. A process for separating para xylene from a C₈ aromatic hydrocarbon fraction containing more than 13 weight percent of para xylene, which comprises mixing the hydrocarbon fraction at an elevated temperature with a complexing agent consisting essentially of antimony trichloride in a ratio of at least 1 mole of antimony trichloride per mole of aromatic feed, cooling the resulting mixture until a eutectic liquid phase and a solid complex of para xylene with antimony trichloride is formed, mixing the cooled mixture of eutectic liquid and solid complex with perfluorodimethylcyclohexane, separating the solid complex from the eutectic liquid, and recovering para xylene from the separated solid complex.

3. A process according to claim 2 wherein the complexing agent is molten antimony trichloride and is mixed with the C₈ hydrocarbon fraction in a ratio of about 1 to 2 moles of antimony trichloride per isomeric xylenes, and where the resulting mixture is cooled to about 30 to 39° C. to form the complex crystals of para-xylene and antimony trichloride.

4. A process according to claim 3 wherein the C₈ hydrocarbon fraction is mixed with the antimony trichloride at about 70° C. to form a liquid solution containing at least about 32 mole percent of antimony trichloride.

5. A process according to claim 2 wherein the cooled mixture of solid complex, eutectic liquid and perfluorodimethylcyclohexane is settled to obtain a lower phase comprising the solid para xylene-antimony trichloride complex and the perfluorodimethylcyclohexane and an upper phase comprising the eutectic liquid, separating the phases, and fractionally distilling the lower phase to separate para xylene from antimony trichloride.

6. A process for separating para xylene from an isomeric xylene mixture which comprises mixing a mixture of meta- and para-xylene containing more than 13 weight per cent of para xylene with molten antimony trichloride in the ratio of about 1.5 moles of molten antimony trichloride per mole of hydrocarbon at a temperature of about 70° C., cooling the mixture to about 30° C., thereby separating crystals of an antimony trichloride-para xylene complex from a eutectic liquid phase, mixing the cooled mixture of crystals and eutectic liquid with perfluorodimethylcyclohexane, settling the resulting mixture to obtain a lower phase consisting of the perfluoro compound and the solid antimony trichloride-para xylene complex and an upper phase consisting of the eutectic liquid, fractionally distilling the lower phase to produce an overhead stream consisting essentially of para xylene and the perfluoro compound and a bottom stream consisting essentially of antimony trichloride, passing the overhead stream to a decanting zone, decanting essentially pure liquid para xylene from the perfluoro compound, separately passing the aforesaid eutectic liquid mixture to a fractionation zone and separating a hydrocarbon stream rich in meta xylene from antimony trichloride.

References Cited in the file of this patent

UNITED STATES PATENTS

| 2,246,257 | Kohn | June 17, 1941 |
| 2,398,526 | Greenburg | Apr. 16, 1946 |
| 2,470,116 | Swietoslawski et al. | May 17, 1949 |
| 2,532,031 | Nixon et al. | Nov. 28, 1950 |
| 2,562,068 | Souders | July 24, 1951 |
| 2,582,197 | Egan | Jan. 8, 1952 |
| 2,605,211 | Deters | July 29, 1952 |
| 2,711,432 | Krzesz | July 21, 1955 |

OTHER REFERENCES

Plotnikov et al.: J. Gen. Chem. (USSR), 15 596 (1945), C. A. 40 5656⁶ (1946).